Figure 1:
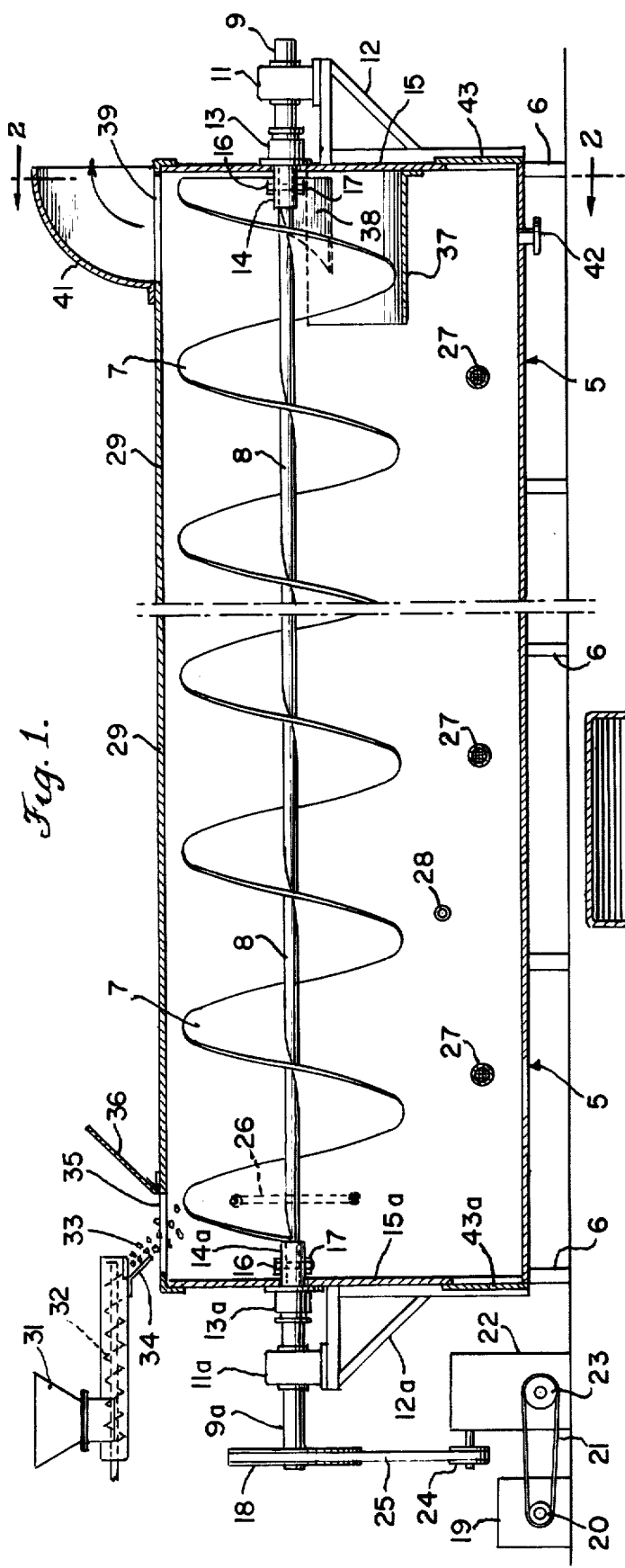

United States Patent [19]
Klein

[11] 3,876,741
[45] Apr. 8, 1975

[54] METHOD FOR EXPANDING POLYMER BIT-PIECES

[75] Inventor: Max Klein, New Shrewsbury, N.J.

[73] Assignee: Sealed Air Corporation, Fair Lawn, N.J.

[22] Filed: Aug. 29, 1972

[21] Appl. No.: 284,601

[52] U.S. Cl. .......... 264/51; 260/2.5 B; 260/2.5 HB; 264/345; 264/DIG. 9; 264/DIG. 69
[51] Int. Cl............................................. B29d 27/00
[58] Field of Search .......... 264/51, 53, DIG. 9, 345, 264/DIG. 69; 260/2.5 B, 2.5 HB

[56] References Cited
UNITED STATES PATENTS
2,944,292 7/1960 Norrhede............................ 264/51
3,086,885 4/1963 Jahn.................................. 264/DIG. 9

OTHER PUBLICATIONS
Stastny, Fritz, "Styropor–Ein Neuartleger, Poryser Kunststoff," pp. 1–15 (Base Reprint from Kunststoffe 44 (1954), No. 4, pp. 173–180, and No. 5, pp. 221–226), Translations Entitled "Styropor–New Porous Synthetic." pp. 1–13 of Translation.

*Primary Examiner*—Philip E. Anderson
*Attorney, Agent, or Firm*—Lerner, David, Littenberg & Samuel

[57] ABSTRACT

Disclosed is a method of expanding bit-pieces of a heated-aqueous-bath-expandable, expansion agent-containing polymer, especially a styrene-polymer, by immersing them in an elongated aqueous heating bath, heating it as needed to keep it at a temperature at which the bit-pieces expand, and propelling them to the discharge end of the bath at a rate for them to be heated sufficiently long to obtain the selected expansion extent.

Apparatus for use in practising that method has an elongated tank for holding the bath, an inlet at the input end to enable charging in the expandable bit-pieces, propelling means to propel them to the discharge end as they are expanding, heating means for maintaining the needed expansion temperature in the bath, and means for enabling the expanded bit-pieces to be discharged at the discharge end.

8 Claims, 2 Drawing Figures

PATENTED APR 8 1975 3,876,741

METHOD FOR EXPANDING POLYMER BIT-PIECES

This invention is that of a method of expanding expansion agent-containing bit-pieces of a heated-aqueous-bath-expandable polymer, that is to say one whose heat softening point does not exceed the boiling point of an aqueous bath inert to reaction with the polymer at the expansion temperature. Such polymer is briefly called "a heated-aqueous-bath-softenable polymer".

More particularly, the invention as to its method is that of expanding the expandable bit-pieces of such a polymer by immersing them at one end of an elongated such aqueous bath while propelling the bit-pieces toward the other end of the bath and at such a rate and for such a time while maintaining the bath temperature at such a level that the bit-pieces have the desired extent of expansion at the discharge end of the bath.

The invention also includes utilizing an apparatus for expanding the bit-pieces of such a polymer in such an aqueous bath, having an elongated tank that enables charging the polymer bit-pieces at one end, and propelling means to propel the expanding bit-pieces to the other end of the tank, heating means for maintaining the needed expansion temperature of the expansion bath during the expansion, and means enabling discharging the expanded polymer bit-pieces from the tank. The apparatus may contain other means for additional purposes, as is disclosed later below.

By an "aqueous bath inert to the polymer" is meant water or an aqueous solution of any substance soluble in water (even if the resulting solution boils above 100°C.) and which solution does not react with the polymer at the particular temperature of use of the bath at atmospheric pressure in the expansion method.

The term "bit-pieces" of a heated-aqueous-bath-softenable polymer (that is, one whose heat softening point does not exceed the boiling point of such aqueous bath inert to the polymer) includes any of the discrete (that is, free-flowing) forms of such heated-aqueous-bath-expandable polymer, such as the various sizes of granules made by cutting the extruded polymer into small lengths and usually called pellets and sometimes crystal as with polystyrene, the beads of various sizes obtained from suspension or from emulsion polymerization or otherwise as molding the finely divided particles obtained by disintegrating any of these different forms, the so-called "grind" including the coarsely ground molded polymers such as styrene-polymer or waste such as molded polymer (of various sizes, e.g., one-eighth-inch thickness, one-fourth-inch width, and three-eighth-inch length), and any other small sized shapes of any of them, or even passing through one inch diameter screen holes.

The heated-aqueous-bath-softenable polymer embraces not only a styrene-polymer but also a polyolefine such as a poly(mono-olefine) as polyethylene, polypropylene, polyisobutylene, or a poly(di-olefine) as poly-butadiene, or a synthetic or natural rubber, or copolymers of any of them or with others such as ethylene-vinyl acetate copolymers, or polyvinyl chloride and polyvinyl acetate copolymers, and others.

Among the foregoing polymers, "styrene-polymer" embraces not only polystyrene itself but also polymers of any polymerizable substituted styrene (for example nuclear-alkylated as alpha-methylstyrene or polyvinylxylene, or mono- or dichloro-styrene, or divinylbenzene) in any of their available average molecular weights, as well as copolymers of styrene with one or more other compatible polymerizable substances as the nuclear-alkylated or -halogenated styrenes, such as the ring-methyl- or -chlorine-substituted styrenes, or even alpha-methyl styrene, or with beta-unsaturated esters, ethers, amides, or nitriles of acrylic acid and their alpha-position-alkylated homologs, vinyl esters of aliphatic and aromatic carboxylic acids, N-vinyl compounds as N-vinylcarbazole, N-vinylimidazole or N-vinylpyrrolidone.

Such copolymers of styrene usually should contain at least about 50% of styrene by weight, or it may be the predominating component or at least equal in predominance to the other higher present part of any terpolymers. The copolymers of styrene include also any of the various impact polystyrenes containing a major part of styrene and a minor part of a styrene-butadiene rubber (usually designated SBR, sometimes called Buna-S), for example, as produced by emulsion polymerization of about 75 parts of butadiene and about 25 parts of styrene.

Thus, styrene-polymers also include styrene alloys of polystyrene with other polymers. Included in styrene-polymers also are the ABS resins, for example, as prepared by using (by weight) acrylonitrile in the range of from about 20 to 30%, butadiene rubber ingredient at from about 10 to 15%, with the balance being styrene to provide a total of 100%. The ABS resin can be of the graft type G (that is with the mixture of the respective amounts of the monomers and butadiene being copolymerized) or of the alloy type B (i.e. for which the separately, for example, emulsion polymerized monomers in the selected proportions are physically mixed together at high temperature as in a Banbury-type mixer), and in either case extruded and pelletized.

Heretofore high heat polystyrene beads and pellets have been expanded by exposing them to steam, or to steam at pressures above atmospheric followed by vacuum. Such expansion procedures have several disadvantages. For example, it is necessary for such expansion operation to be carried out in a plant equipped at least with a steam boiler, but if the plant has none, it is necessary to have an individual steam generator for the expansion operation.

In addition, there also are needed not only the steam pipes to convey the steam to the expander but also the various controls such as steam pressure regulators and others required for working with steam. Then also, attempts to provide steam-expanded all purpose polystyrene yielded a brittle useless product.

The method of this invention not only overcome these disadvantages and others but also enable producing expanded all purpose polystyrene, and also expanded other heated-aqueous-bath-softenable polymers.

Considered broadly, the method of the invention comprises (i) immersing expandable bit-pieces of an expansion agent-containing heated-aqueous-bath-softenable polymer in the feed input end of an elongated aqueous heating (or expansion) bath having a feed input end and an expanded product discharge end, (ii) by heating said bath as needed maintaining it at a temperature sufficient to cause the expansion agent in said bit-pieces to expand therein and thereby expand them, (iii) and at the same time propelling the so expanding bit-pieces toward the discharge end of said bath and at such a rate that said expanding bit-pieces are exposed to and heated by said heated expansion bath for a time sufficient for them to have the selected extent of expansion when they are at the discharge end of said bath; and (iv) discharging the thus expanded bit-pieces from said discharge end.

Also considered broadly, the apparatus utilized by this invention can be used in expanding free-flowing bit-pieces of a heated-aqueous-bath-softenable, expansion agent-containing polymer by immersing those bit-pieces in a heated aqueous expansion bath, and comprises an elongated tank for holding the aqueous expansion bath and having a feed input end and an expanded product discharge end, a bit-pieces input inlet enabling charging said bit-pieces into that feed input end, propelling means operable within said tank to propel the expanding bit-pieces toward the product discharge end, heat-providing means to enable maintaining the expansion bath at a selected temperature level; and at the discharge end means to enable discharging the expanded bit-pieces from the tank.

Figure 2:
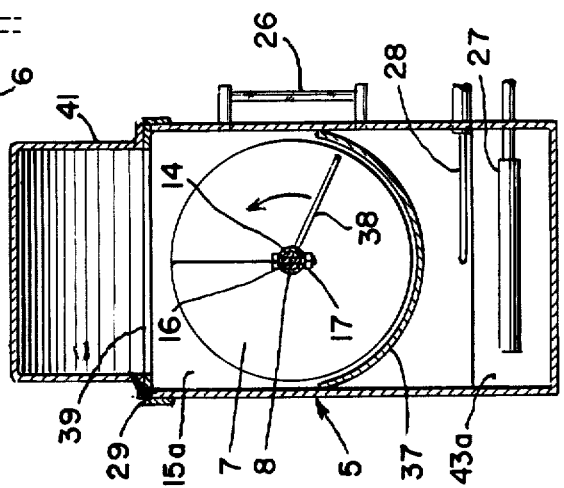

The method of this invention is explained more fully in the following detailed description in relation to the accompanying drawings wherein:

FIG. 1 is a longitudinally contracted side elevation of one embodiment of the apparatus, with the tank and its cover shown in section; and FIG. 2 is a vertical section taken along the line 2—2 of FIG. 1 looking in the direction of the arrows.

Initially referring particularly to FIG. 1, tank 5 advantageously is supported shortly above the floor level on legs 6. The helical or screw propeller 7 is rotatably suspended by having the ends of its shaft 8 inserted snugly into the open ends of the inwardly extending sleeves 14 and 14a of the supporting sleeved-shaft-parts 9 and 9a. The respective outer ends of the latter are carried rotatably on bearings 11 and 11a mounted on their respective brackets 12 and 12a.

Sleeve ends 14 and 14a of shaft-parts 9 and 9a extend shortly into the interior of the tank through stuffing boxes 13 and 13a liquid-tightly and removably secured about suitably located orifices in the respective end walls 15 and 15a of tank 5, thereby snugly to receive the opposed ends of shaft 8. The latter is secured to rotate with shaft-parts 9 and 9a by bolts 16 and 16a inserted diametrically through sleeves 14 and 14a and the ends of shaft 8, which are tightly secured by suitable fastening means such as nuts 17 and 17a with intermediate suitable lock washers (not shown).

Propeller-drive pulley 18 is affixed detachably rigidly by interlocking means (such as a key in slot, not shown) to the outer end of sleeved-shaft-part 9a to enable providing rotation to sleeved-shaft-part 9a thereby to rotate shaft 8 and the integrally affixed thereto screw propeller 7.

A suitable motive source such as motor 19 with driving pulley 20 frictionally fitted to its shaft provides the power to drive pulley 18, through the intervention of speed reducer 22. The latter is operated by belt 21 driven by motor pulley 20 and extending in driving connection with driven pulley 23 of speed reducer 22. Propeller shaft 8 then is driven by reduced speed driving pulley 24 of speed reducer 22 by belt 25 extending in driving association with pulley 18.

Sight glass 26, extending outwardly from a suitable location such as the rear wall of tank 5 (as viewed in FIG. 1) and communicating with its interior, enables watching the level of the heated aqueous expansion bath as needed, and maintaining that level, advantageously by combination (not shown) of a sensor electrically connected with a valve control-regulator for automatic operation of the water feed line valve.

Tank 5 is equipped with suitable heating means for heating the expansion bath to the required polymer bit-pieces expansion temperature, such as heating coils at least along the bottom of the tank or a water-jacket around the bottom and/or sides of the tank, or otherwise and in each case with suitable insulation (not shown). Advantageously the heating means is a plurality of electrical immersion heaters 27 connected to a suitable exterior power source (not shown) and spaced apart from one another below the lowest reach of the periphery of the flights of the propeller screw, effectively to provide substantially even heating.

The expansion bath temperature can be sensed by an efficient thermocouple 28 extending through a wall of the tank into a location under the lowermost periphery of the propeller screw at an effective location to enable adequately detecting the bath temperature. The thermocouple is connected with a thermometer or recording thermometer (not shown) exterior of tank 5 and in turn associated with electrically operated means to control the power input to maintain the required expansion bath temperature.

Heat efficiency and clean operation is provided by covering tank 5 with insulated (not shown) tank cover 29 held in place by a short depending flange encircling its entire periphery. Conveniently the underside of cover 29 need be spaced vertically from the uppermost reach of the periphery of the propeller screw merely sufficiently to avoid contacting it. Ordinarily a separation of about an inch between them is sufficient.

The basic operating elements of the expansion tank of the invention in their assembly have thus far been disclosed and identified. The starting expansion-agent-containing heated-aqueous-bath-expandable starting polymer bit-pieces can be introduced at one end of the tank depending on the planned direction of rotation of screw propeller 7, specifically at the left hand end (as in FIG. 1) in view of the rotation direction shown by the arrow in FIG. 2. The finished product (expanded polymer) then is to be removed at the other end.

For smooth continuous operation, the bit-pieces of the starting expandable polymer (from the convenient supply source not shown) flow continuously through hopper 31 (FIG. 1 upper left end) to be propelled by feed screw 32 from the end of which polymer bit-pieces 33 flow down feed chute 34 through feed opening 35 (while feed door 36 is held open) into the water or other aqueous expansion bath heated to a temperature suitable to expand the particular starting polymer that is being charged.

Feed screw 32 can be operated by a separate motor and gear reducer, and designed to enable changing gears to provide a choice of two speeds. Alternatively, it can have on its shaft a pulley of suitable diameter for the desired speed, and driven by a belt extending in operating connection with a suitably sized pulley on shaft-part 9a.

With motor 19 running, shaft 8 and screw propeller 7 are rotated. Then as the freshly charged bit-pieces 33 enter and sink into the heated-aqueous-expansion bath, expansion of them starts promptly (actually within a matter of seconds) and continues as they are propelled away from the feed input end of tank 5. As soon as they obtain a bulk density less than that of the bath, they rise and float along its surface as their expansion continues while they are propelled further along toward the discharge end.

Then the expanded product accumulating at the discharge end builds up in quantity and still propelled by the rotation of propeller screw 7, they pass through discharge outlet 39, and directed by the discharge shield 41, the expanded bit-pieces are discharged onto a chute (not shown) to means to convey them away from the expander.

Movement of the sufficiently expanded polymer bit-pieces to and through discharge outlet 39 and their passage out of discharge shield 41 is enhanced by including a stationary restraining baffle 37 to avoid their being pushed downward by increasing accumulation of finished product propelled to that area by continuing rotation of propeller screw 7. Such discharge movement is enhanced further by including paddle-baffle 38 affixed to and extending radially outwardly from shaft 8 and for a distance along it about equal to the width of discharge opening 39 (measured normal to end wall 15.) Paddle 38, by providing a force directing the sufficiently expanded bit-pieces upwardly from the lower end of the diameter of propeller screw 7, enhances their discharge through opening 39.

Drain 42, liquid-tightly closed during operation of the expander, is designed to be opened when the expansion bath is to be discharged for any reason, such as for replacement by a fresh bath. The expander of the invention is designed to expand not only so-called virgin (i.e. not previously used) expansion agent-containing or impregnated heated-aqueous-bath-softenable polymer bit-pieces but also ground waste or scrap molded heated-aqueous-bath-softenable polymers. As these latter sometimes may be admixed with other polymers which cannot be expanded at aqueous bath temperatures or impregnated with an expanded agent, or include other solid materials such as metal pieces, being heavier than water, these substances and materials settle to the bottom of tank 5. Liquid-tightly closeable clean-out doors 43 and 43a are provided to be opened when needed to allow removing accumulations of any such sunken non-expanded material. For that reason, the embodiment shown in the drawing has a tank slightly taller than one that is needed if only so-called virgin expandable polymers and no waste or scrap material are to be handled in it.

The expander of the invention is illustrated by, but not restricted to, the following example:

Example 1 - Expander: The helical screw propeller 7 has a diameter (normal to its shaft) of 2 feet and a distance of 12 inches between consecutive flights, and a total of 8 flights. The end walls 15 and 15a of tank 5 are 3 feet high measured within the tank and 2 feet and a half inch wide (in the interior of tank 5) so as to provide a quarter of an inch clearance between the front rear walls and the outer periphery of propeller screw 7. The distance between the opposed inner surfaces of end walls 15 and 15a is 8 feet and one inch, providing a half inch clearance between the ends of propeller screw 7 and end walls 15 and 15a.

Fixed baffle 37 is semicircular and one foot in horizontal width and has a radius to provide a half inch clearance with the outer periphery of propeller screw 7. Paddle 38 has a radius of one foot and at its outer end extends 7 inches parallel to the axis of shaft 8. Each of immersion heaters 27 is rated 7.5 KW.

The speed of motor 19 and the ratios of the diameters of the pulleys 20, 23, 24 and 18 are such as to rotate propeller screw 7 at 8 revolutions per minute. With ground waste or scrap polystyrene, the expander of Example 1 has been operated, with propeller 7 rotating at 8 r.p.m., at a production load, at different times, from as little as 125 pounds up to 600 pounds per hour of ground scrap general purpose as well as high melt polystyrene bit-pieces passing through a screen having one inch diameter perforations.

The different dimensions of the various essential parts of the expander can be varied depending on the ultimate production capacity desired for it and also on the heat distortion point (earlier herein referred to as the "softening point") of the polymer to be expanded and also on whether it is a high heat or a general purpose polymer.

The height of tank 5 can be shortened by at least 6 inches if the expander is planned to be used solely on so-called virgin heated-aqueous-bath-softenable polymers free of any non-expandable material. The number and heating capacity of the immersion heaters can be varied as influenced by the maximum production rate load planned for the expander, and also the boiling point of the aqueous bath if it is to contain any dissolved inert salts when it is desired to expand polymers which require for expansion a bath temperature slightly higher than 212°F. Also, interchangeable additional pulleys with different diameters can be provided to enable varying the ratios between the diameters of pulleys 20, 23, 24 and 18, to enable providing a rotation rate of as little as even 4 r.p.m. or up to, for example, as much as 12 or more r.p.m. depending on the planned for production load rate.

The shape of tank 5 is not limited to rectangular prismatic. For example, the lower part of tank 5 from at or shortly below the level of shaft 8 can be semi-oval or semi-circular in cross-section in a plane normal to and intersecting shaft 8, or may be entirely oval (with the longer diameter vertical) or circular in such cross-section.

So also, while presently a rotating propeller screw, as shown in the drawing and earlier above described, was found to be the more effective means for propelling the expanding polymer bit-pieces, any other means that suitably can propel them can be used. Likewise, any other speed reducing means or arrangement or combination can be used. Also, some other combination or method of feeding or charging the starting bit-pieces to the input end of tank 5 can be used.

While, as presently indicated, it has been found to be most practical and most economical for the apparatus to have a cover, it is recognized that the apparatus can perform the required expansion of the polymer bit-pieces even without a cover. Accordingly, the expression "bit-pieces input inlet" in the main apparatus claim is used in the broad sense not restricted to specifically having the feed opening 35 in cover 29 but rather as also including merely having an open area at the feed input end of the tank, into which to charge the bit-pieces.

Also, the expression "means at said discharge end" similarly is used in the broad sense to embrace also merely the open area at the discharge end of the tank used without a cover, as opposed to being restricted solely to the inclusion of the discharge opening 39 in cover 29.

While the method of the invention actually has been disclosed in the foregoing description of the invention, it is illustrated further by, without being restricted to, the following examples:

Example 2 - Virgin Polystyrene Crystal Pellets: Virgin (cut extruded) one-eighth inch long pellets (about one-eighth inch in diameter) having a Vicat softening point of 219°F. and impregnated with 8 percent of pentane (and as impregnated having a lower heat distortion point of about 205°F.) were fed continuously into water maintained at 210°F. (at a depth to cover shaft 8) in the expansion apparatus of Example 1, at the rate of 400 pounds per hour while the shaft and the affixed screw propeller were rotated at 8 r.p.m. The expanded product discharged continuously at the end of the apparatus and showed a dry bulk density of about 0.9 pounds per cubic foot.

To eliminate bunching and jamming of the expanded product that may occur at the discharge end at the high production rate, it is advantageous and preferred to include in the water used for the expanding bath, and as for Example 1, a very small amount of a low to non-foaming anionic wetting agent, for example, sodium lauryl sulfate in an amount from sufficient to eliminate such jamming to about 1.5 pounds for the 32 cubic feet approximate starting volume of water used as the expansion bath, maintaining it effectively at from about 0.05% to about 0.1% by weight, by make-up additions of about 100 grams per 200 pounds of expanded product.

To meet any need for a final expanded product of lower bulk density, the product of an initial run, as in Example 1, showing dry bulk density of from 0.9 to about 1.1 pounds per cubic foot, on being fed again through the same bath but at from about a couple or so degrees F. higher yields a product with a dry bulk density of about 0.5 to about 0.7 pounds per cubic foot.

Example 3 - Scrap Molded General Purpose Polystyrene: Using the same bath and apparatus as in Example 2, scrap pigmented molded general purpose polystyrene grind (screened to pass through a screen having one inch diameter holes) was fed continuously at the rate of 250 pounds per hour through an expansion bath of water containing 0.05% by weight of the anionic wetting agent while maintaining the bath at between 200° and 204°F. and yielded an expanded product with a dry bulk density of about 1.1 pounds per cubic foot; said scrap initially having contained 8% of pentane.

To meet the requirement for a product with a lower dry bulk density, the product of the first expansion of this example was fed continuously through the bath (containing the wetting agent) maintained at a temperature of from 206° to 208°F. and at the same 250 pounds per hour and discharged a product having a dry bulk density of about 0.6 pounds per cubic foot.

Depending on the heat distortion point of the expansion-agent-containing impregnated starting polymer bit-pieces, general purpose polystyrene can be expanded in the range of from 160° to 190°F. whereas impregnated high melt polystyrene can be expanded at, depending on its heat distortion point, somewhere within 190° to 212°F.

Any other of the above broadly described polymer bit-pieces can be expanded in the same way as illustrated in Examples 2 and 3, and generally beneficially with the inclusion of a low to non-foaming anionic wetting agent in the aqueous bath.

While the various polymers concerned have their ordinarily indicated heat distortion point, it is found that after the bit-pieces of the polymer have been impregnated, the resulting expansion-agent-containing polymer bit-pieces manifest a heat distortion point lower than that of the product before impregnation.

While the invention has been illustrated by detailed description of certain specific embodiments of it, it is understood that various modifications and substitutions can be made in any of them within the scope of the appended claims which are intended also to include equivalents of these embodiments.

What is claimed is:

1. A method of expanding bit-pieces of an expandable thermoplastic organic polymer impregnated with an expansion agent, which method comprises
    a. providing an elongated tank having a feed input end and a product discharge end and substantially free of specific means to disintegrate agglomerates of expanding and/or expanded bit-pieces;
    b. maintaining said tank partially filled with an aqueous bath;
    c. maintaining said bath under atmospheric pressure and at a temperature within the range of from about 160° to about 212° F. or slightly higher, said temperature being sufficient to cause the expansion agent in said bit-pieces to expand therein and thereby expand said bit-pieces;
    d. feeding said bit-pieces through said feed input end of said tank into said bath at a flow rate within the range of from about 2.6 to about 21 lb/hr/cu. ft. of said tank so that said bit-pieces are immersed in and heated by said bath to cause expansion of said bit-pieces and reduction of the bulk density thereof to less than that of said bath;
    e. allowing said so-expanding bit-pieces having a bulk density less than that of said aqueous bath to float along the surface of said bath, and at the same time propelling the so-expanding bit-pieces toward the discharge end of said tank at such a rate that said expanding bit-pieces are heated by said bath for a time sufficient for them to attain the selected extent of expansion when they are at the discharge end of said tank, whereby said bit-pieces float freely without inclusion of specific means to disintegrate agglomerates and remain discrete and substantially free of agglomerates thereof as they reach said discharge end; and
    f. discharging the thus expanded bit-pieces substantially free of agglomerates thereof from said discharge end.

2. The method in accordance with claim 1 wherein said feeding of said bit-pieces into said feed input end of said tank comprises dropping said bit-pieces from above the surface of said aqueous bath therein thereby causing said bit-pieces to disperse while falling into said aqueous bath.

3. The method in accordance with claim 2 further including the step of separating and removing non-expanded solid materials from said aqueous bath.

4. The method as claimed in claim 2, wherein the said polymer is a styrene-polymer.

5. The method as claimed in claim 4, wherein the styrene-polymer is general purpose styrene.

6. The method as claimed in claim 5, wherein the styrene-polymer is high heat polystyrene.

7. The method as claimed in claim 4, wherein the styrene-polymer is scrap polystyrene grind.

8. The method as claimed in claim 2, wherein said aqueous expansion bath contains an amount of a low to non-foaming anionic wetting agent sufficient to prevent the expanded bit-pieces from jamming at the discharge end of the bath.

* * * * *